United States Patent [19]

Karppo et al.

[11] 4,155,695

[45] May 22, 1979

[54] CONTINUOUS CURING DEVICE FOR LONGITUDINALLY EXTENDED PRODUCTS WITH COOLING ZONE

[75] Inventors: Jukka S. Karppo, Helsinki; Matti A. Aaltonen, Espoo, both of Finland

[73] Assignee: Oy Nokia AB, Helsinki, Finland

[21] Appl. No.: 756,543

[22] Filed: Jan. 3, 1977

Related U.S. Application Data

[62] Division of Ser. No. 707,097, Jul. 20, 1976.

[30] Foreign Application Priority Data

Oct. 21, 1975 [FI] Finland .................................. 752942

[51] Int. Cl.² .......................... B29H 5/24; B29H 5/28; B29H 7/14
[52] U.S. Cl. .................................. 425/445; 425/174.4
[58] Field of Search .............................. 425/445, 174.4

[56] References Cited

U.S. PATENT DOCUMENTS 4,035,129   7/1977   Karppo et al. ........................ 425/445

Primary Examiner—J. Howard Flint, Jr.
Attorney, Agent, or Firm—Haseltine, Lake & Waters

[57] ABSTRACT

An apparatus for continuous curing (vulcanization) of elongated products, such as cables comprising a conductor surrounded by a mantle of a crosslinkable material. The cable is passed longitudinally through a curing tube in which the cable is first subjected to heating in a heating zone for heating the cable to curing temperature and subsequently subjected to cooling. The heating of the cable in the heating zone is carried out by means of heat radiation in a pressurized gas atmosphere and the cooling of the cable in the cooling zone is carried out in the presence of a gas under pressure so that heat is transferred from the heated cable in the cooling zone partially by radiation to the cooled wall of the tube and partly by convection to said cooled gas.

7 Claims, 8 Drawing Figures

CONTINUOUS CURING DEVICE FOR LONGITUDINALLY EXTENDED PRODUCTS WITH COOLING ZONE

This is a division of application Ser. No. 707,097 filed July 20, 1976.

This invention is directed to an apparatus that is employed for the continuous curing (or vulcanization) of longitudinally extended crosslinkable products and is related to our U.S. Pat. No. 4,035,129 issued July 12, 1977. According to the present invention the product undergoing crosslinking is drawn through a curing tube and is subjected in it to radiation heating in a heating zone, to heat the product up to the curing temperature, and subsequently to cooling in a cooling zone, to cool the cured product.

It is well known that a curing tube, through which the crosslinkable product is drawn, and in which the product is subjected firstly to heating, so that the material, in the product, containing the crosslinking agent reaches a temperature at which the crosslinking reaction can take place, and then to cooling, and is finally quided out of the curing tube, can be used for the crosslinking of cables. Included in this type of crosslinking material are, for example, high density polyethylene, low density polyethylene, ethylene propylene rubber and other synthetic and natural rubbers.

Various methods of carrying out the heating of the crosslinkable product, some of which are described in the following, have, up to now, been generally known.

The crosslinkable product can be heated by steam usually at a temperature of 180°–210° C. and a pressure of 1.0–2 MPa, in the curing tube. The curing capacity depends on the length of the tube and the temperature of the steam. Any increase in the steam temperature necessarily causes a corresponding increase in its pressure, putting additional requirements on the strength of mechanical parts. It is therefore seldom considered economical to exceed the above-mentioned values of temperature and pressure for devices in current use, and neither is increasing the tube length economically viable beyond a certain limit. Catenary-shaped tubes are generally 100–150 m in length and vertical tubes 40–70 m.

Heating of the crosslinkable product by means of infrared radiators located inside the tube is another well known method. The pressure necessary in the tube is produced by inert gas. This type of device is described in U.S. Pat. No. 3,588,954. The locating of the infrared radiators inside the tube is technically difficult and, because of their spatial requirements, the diameter of the tube must be considerably increased and its walls reinforced. The radiators have a high surface temperature and thus the surface of the crosslinkable product can easily be damaged. For this reason the method is applicable only to vertical tubes. Only a small sector is heated efficiently by the radiators. Heating of the product does not occur uniformly, as the radiators consist of separate heating elements and only a finite number of radiators can be located inside the tube. Steam mixing with the inert gas, and the gases produced during the curing process must be removed from the tube by cycling the inert gas through a complex purifying and drying system. In addition the raw material to be crosslinked must be of a special type capable of withstanding the high surface temperature of the heaters used in the system. The cooling zone must also be extended because of the higher curing temperature.

Heating of the crosslinkable product using hot inert gas which is itself heated by a heating device located outside the curing tube is known from U.S. Pat. No. 3,645,656. The heat transfer capacity of gases is however small compared, for example, with steam, and therefore this method cannot compete with the earlier described steam curing system.

Each of the systems described above employs water cooling. The detrimental effect of steam and water on the cured products is however well known. Water penetrates the crosslinkable material easily at high temperatures, causing a porous structure consisting of micro-voids whose diameters are in the range 1–20 $\mu$m. From this standpoint steam curing is clearly inferior to systems using inert gas. More micro-voids occur and their average diameters are larger than those in products cured in inert gas. Purification and drying of the inert gas outside the tube improves the quality of the product but micro-voids still occur.

In the production machinery used in the tests, both steam and inert gas curing methods were studied in combination with water cooling. The degree of dryness after curing and cooling can be estimated using the so-called direct method, in which the cable insulation is stressed in an alternating voltage field and after that studied under a microscope using the Mitsumara-Yamanouchi colouring method to find the so-called water trees. These water trees originate from water-filled micro-voids occuring in the insulation, as the cable is subjected to voltage stress. It has been established that water trees weaken the electrical strength of the cable. Typical voltage stresses are 5–10 kV/mm, 50 Hz–5 kHz, and duration of stress from 50 hours up.

The tests carried out verify that cables cured in either steam or inert gas and cooled in water contain such quantities of water that water trees begin growing when a voltage is applied across the insulation.

As was previously explained, micro-voids originate, during the curing process, from the presence of water, the penetration of the water being due to the hygroscopy of the raw materials, such as plastic or rubber, used. The phenomenon takes place very quickly owing to the high temperature of the crosslinkable product when it comes in contact with the water. Water vapourised from the surface of the cooling water also enters the heating zone. The detrimental effects of vapourisation can be reduced to a certain extent by the construction of a cold trap, as previously mentioned, or a seal between the heating and cooling zones, in which part of the steam will be condensed.

The object of this invention is to produce a curing device which enables products to be cured under completely dry conditions, in other words, the heating and cooling are carried out in completely waterfree space. This object is accomplished with an improved device for curing longitudinally extended crosslinkable products, such as cables, comprising a curing tube through which the product undergoing crosslinking is drawn, a heating zone, provided with equipment for heating the product in the curing tube up to the crosslinking temperature, and a cooling zone for cooling the crosslinked product and wherein said improvement being to provide said cooling zone of said curing tube with means to conduct the gaseous medium into said cooling zone, to contact the crosslinked product.

In accordance with the invention, conditions giving rise to the damaging micro-voids caused by water are completely avoided, is devised, since cooling takes place in water-free space, and the detrimental effect of water in the crosslinked product is thus eliminated.

Gas which has no harmful effect on the crosslinked product is used as the medium in the cooling zone. Such a gas is, for example, nitrogen, carbon dioxide, sulphur hexafluoride or certain inert gases.

The following table shows the size and frequency of occurrence of micro-voids in unspecified methods. The area examined was 0.157 mm$^2$ and the number of samples 37.

| Method | <μm | >1μm <3μm | >3μm <10μm | >10μm |
|---|---|---|---|---|
| 1. Steam heating + water cooling | infinite number | | | |
| | 00 pcs | 23 pcs[33] | 20 pcs | 8 pcs |
| 2. Dry heating + water cooling | 40 " | 10 " | 7 " | 2 " |
| 3. Dry heating + dry cooling | 10 " | 3 " | 1 " | 0 " |

$^\times$ heat treated for a week at 70° C.

Usually micro-voids contain water although micro-voids in a product manufactured under completely dry conditions do not contain water. They orginate from other impurities in the material and have no effect on the origin or growing of water trees.

In contrast to the prior art the invention produces cable which is so dry that water trees do not grow, indicating a significant improvement in the quality of the cables. The dry condition of the cable can easily be preserved by providing the cable with a moisture-proof metal or other appropriate sheath.

It is beneficial to heat the crosslinkable product in the heating zone, by means of an electric current conducted through the curing tube itself, thus heating the curing tube to form a uniform heating mantle which radiates heat to the crosslinkable product. Heating of the product takes place partly by convection too.

Heating of the crosslinkable product using the invention described above has considerable advantages over other radiation heating. As heating occurs so evenly, the temperature of the product can be lowered, allowing the normal covering materials to be used. The length of the heating zone can also be made shorter than in other methods, and, because of the smaller heat content of the product, the cooling zone can be made shorter, or alternatively a higher production speed can be used in tubes of the same length. Because of the lower curing temperature the product is less eccentric than products manufactured at higher curing temperatures.

The invention is described in more detail in the following, with reference to the attached drawings in which one useful embodiment of the invention is shown:

Figures 1, 2:
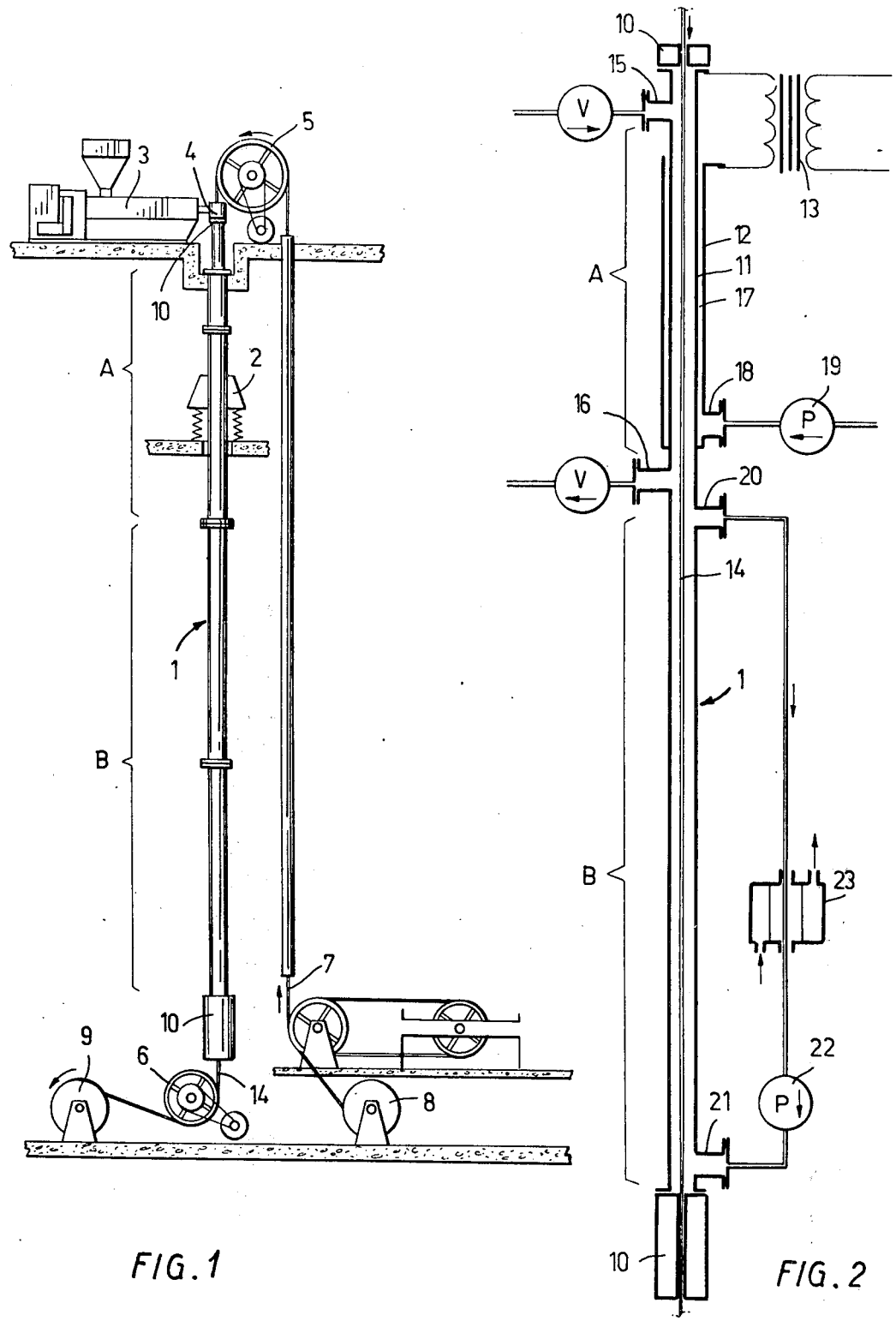
FIG. 1 shows a side view of one embodiment of the curing device in accordance with the invention, in which the curing tube is vertical and the cable travels through it from top to bottom.
FIG. 2 shows a schematic view of a vertical crosssection of the curing tube of the device.
Figure 3:
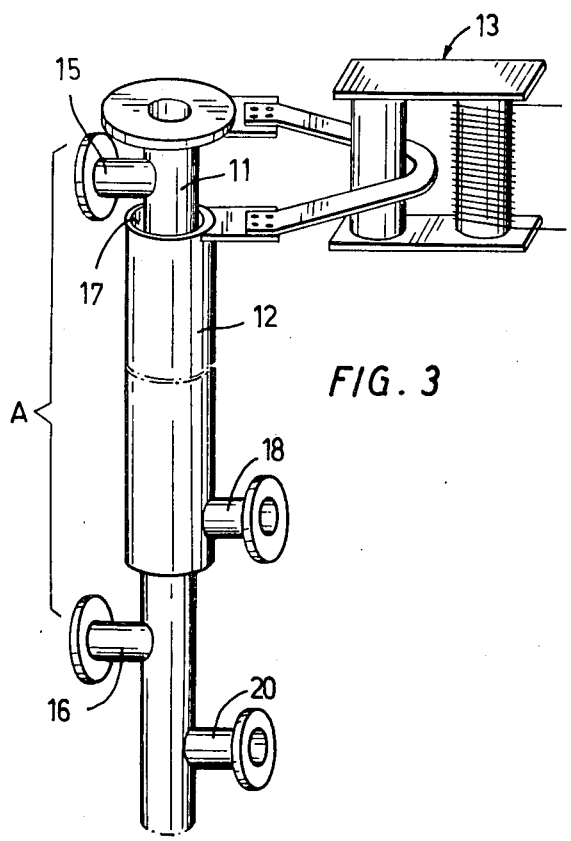
FIG. 3 shows the heating zone of the curing tube on a larger scale.

FIG. 1 shows a vertical curing line consisting of a vertical curing section 1, which is held in a vertical position by means of support 2 and extruder 3 located at the top end of the curing section, the head of the said extruder being located as a continuation of the curing section. Capstans 5 and 6, for the conductor 7 which is drawn from the take-off reel 8 to the take-up reel 9, are located at the upper and lower ends of the curing section. The conductor is given a covering, at the extruder head, which is first heated to the curing temperature and is then cooled in the curing tube 1. The curing section 1 is fitted with seals 10 at its upper and lower ends, which are airtight, and through which the covered conductor 14 moves.

FIG. 2 shows the curing section 1 on a larger scale, consisting of a curing tube 11 through which the crosslinkable product is quided axially, in this case from the top end of the tube, and through the tube towards its lower end. The tube is made of pressure and temperature resistant material such as steel. While passing through the tube the product is subjected to curing heating and then to cooling. The heating zone is denoted by A and the cooling zone by B. The curing tube is surrounded over the heating zone, by a concentric mantle tube 12, which is made, for example, of copper. The upper end of this mantle tube is connected to one pole of a low voltage transformer 13, and the upper end of the curing tube is connected to the other pole of the transformer so that the mantle tube functions as a connection conductor for the heating current to the curing tube. When the electric current is connected the curing tube heats up and functions, within the heating zone, A, as a heating mantle which is uniform both around its circumference and along its axis, and from which heat radiates to the crosslinkable product.

At the upper end of the heating zone of the curing tube is an inlet connection 15, and at the lower end is an outlet 16, for example nozzle for the direction of the inert gas through the curing tube. Cooling air can be blown into the ring-shaped channel 17 inside the mantle tube 12 by means of the inlet 18 located at its lower end and blower 19.

Instead of the single heating mantle shown in FIG. 2, the heating zone A may consist of several adjacent heating mantles. The starting end of the curing tube is then made up of separate adjacent tube sections each of which is connected to its own transformer, so that these tube sections function as heating mantles when the current is connected. By correct regulation of the transformers the temperature distribution of the heating zone can be set to correspond to the optimum curing process for the crosslinkable product in question.

The cooling of the crosslinked product is carried out, completely without the use of water or steam, using a method in accordance with the invention.

In accordance with FIGS. 1 and 2, the crosslinked product is cooled in the cooling zone, B, by means of gas or air circulating through the tube. The curing tube is equipped with an outlet 20 at the starting end of the cooling zone B, and at the finishing end with an inlet 21 for the cooled gas. This gas circulates through heat exchanger 23 by means of blower 22.

Figure 4:
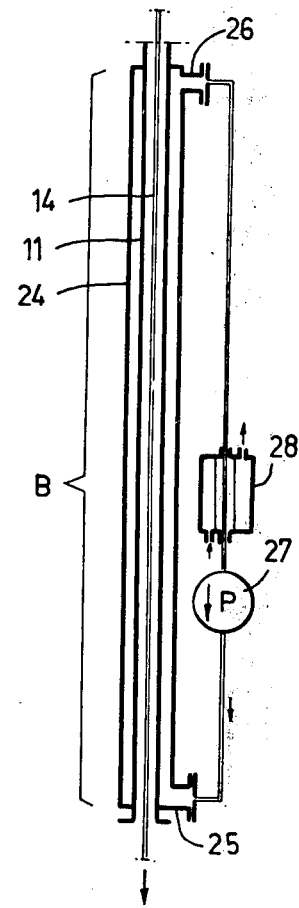
FIG. 4 shows a schematic view of an alternative embodiment of the cooling zone of the curing tube.

As shown in the cooling method in FIG. 2, the cooling gas is circulated under pressure, through inlet and outlet 21 and 20, and through the curing tube so that the gas cools the crosslinked cable and heat is removed from the gas outside the tube. It is also possible to equip the cooling zone of the curing tube 11 with an outer mantle 24 which is provided with an inlet 25 and outlet 26 for the circulation of gas or liquid within the mantle by means of pump 27 and through heat exchanger 28. The curing tube is then filled with gas. At the starting end of the cooling zone the hot product also radiates heat to the wall of the tube 11, which is kept cool. Heat is also transferred from the crosslinked cable into the gas which transfers the heat to the wall of the curing tube 11, this in turn being cooled by means of liquid or gas circulating inside the said mantle. This type of construction is shown in FIG. 4. In order to direct the gaseous medium into the curing tube and to keep it under pressure in the cooling zone, B, the cooling zone must be equipped with suitable inlet and outlet connections for the medium, which are not described here. Instead of collecting and redirecting into the tube after cooling, the gas which is initially blown into the tube, it is possible, under certain circumstances, to allow the gas to pass out of the tube directly into the atmosphere, for example through outlet 20.

Figure 5:
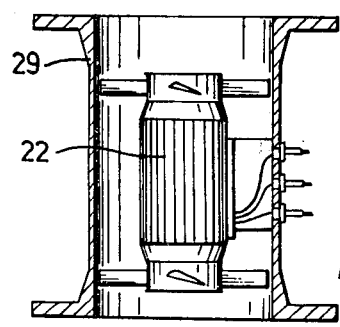
FIG. 5 shows the location of the blower for the circulation of cooling gas on a larger scale.

It is advantageous if the blowers 22 circulating the gas in the cooling zone are fitted directly inside tube 29 as shown in FIG. 5.

In the following, an example of the curing of a plastic insulated cable with a device in accordance with FIGS. 1 and 4 is presented. An aluminium conductor of diameter 10.0 mm which is to be coated with plastic drawn, by means of a capstan, through the extruder head, into the curing tube, and then, by means of another capstan, on to a take-up reel. A polyethylene coating of thickness 12 mm is extruded on to the conductor in the extruder head. The extrusion temperature is 125° C., and the heating zone A is heated by five A.C. transformers each of which is supplying an alternating current of 2.0–2.5 kA to its appropriate section.

The temperature at the upper end of heating zone A of the curing tube is 350° C. over a distance of 15 meters, and the temperature of the following 23 meters is 300° C. The temperature at the upper end of the cooling zone B is maintained at room temperature by blowing air into the mantle tube which surrounds it. The curing tube is filled with nitrogen at a pressure of 1.4 MPa. Both the inert gas circulating in the heating zone and the cooling gas circulating in the cooling zone are kept under pressure in order to prevent the formation of gas bubbles during curing.

In this example the product was cured at a speed of 3.5 meters/minute and the degree of curing obtained was 90%.

In previously known methods it has been necessary, when carrying out the curing process, to locate the starting end of the process on a higher level than the finishing end, so that the shape of the line prevents the water used in the water cooling from flowing into the heating zone. This leads to expensive building constructions, the operation of the line requires more personnel, and the control and operation of the line is more difficult.

Figure 6:
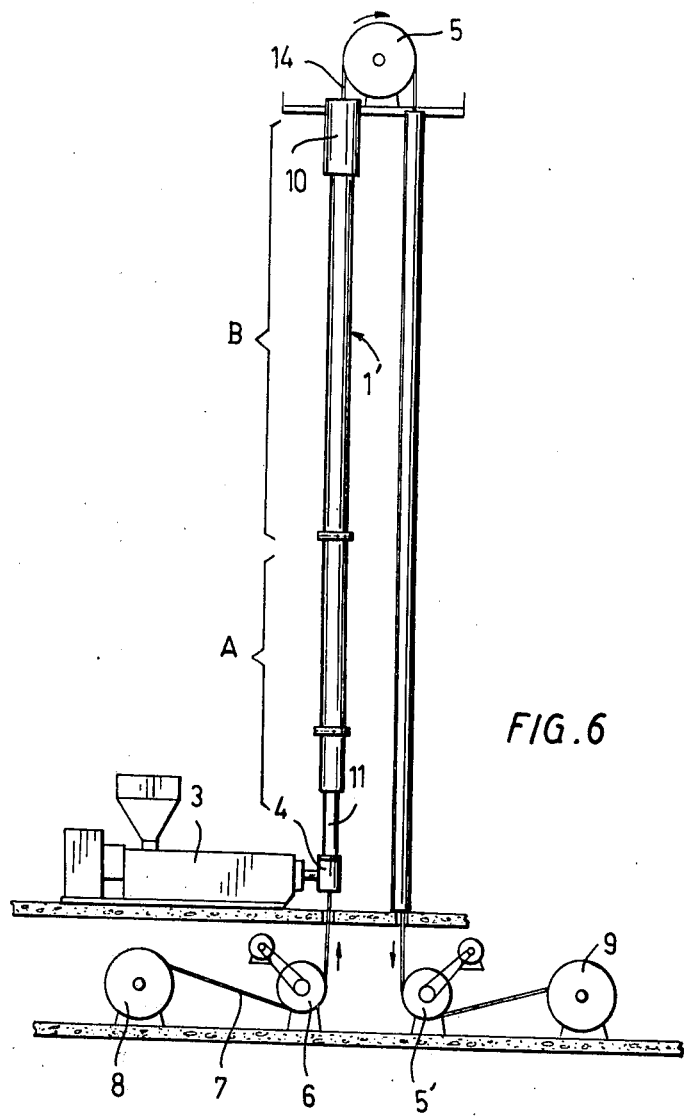
FIG. 6 shows an alternative embodiment of the curing device, having a vertical curing tube through which the cable is drawn from the bottom up.
Figure 7:
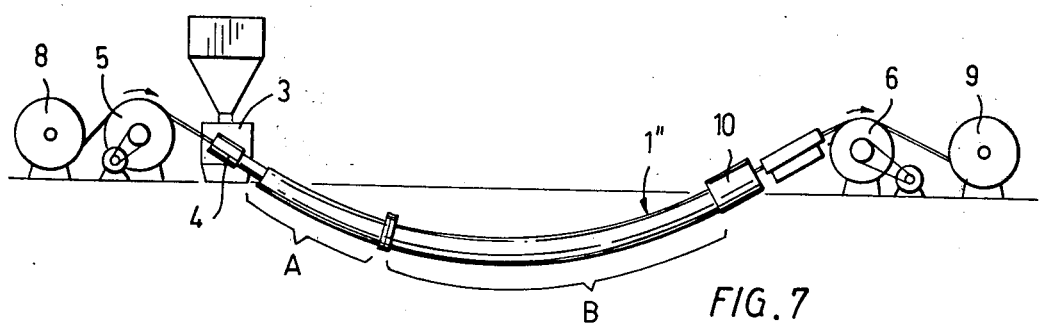
FIG. 7 shows another embodiment of the curing device, having a horizontal and curved curing tube.
Figure 8:
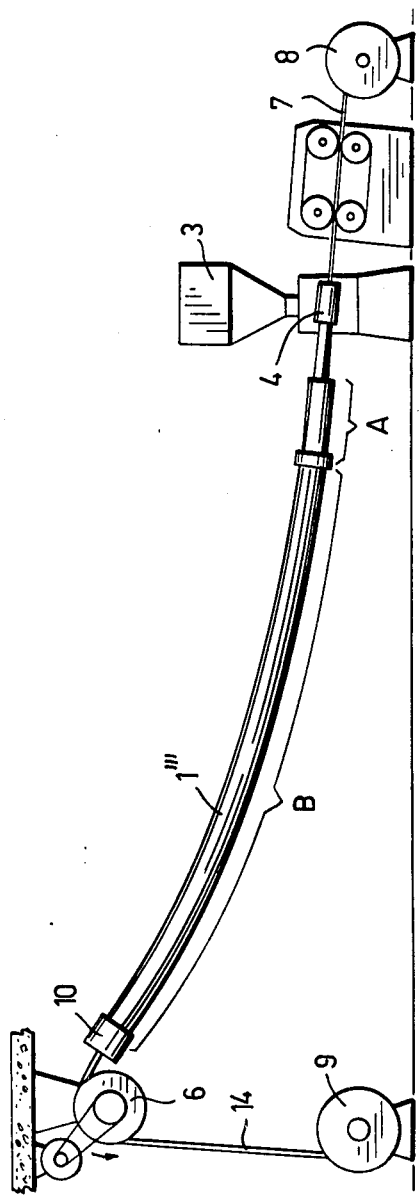
FIG. 8 shows another embodiment of the curing device, having a curved curing tube, the starting and finishing ends of the line being both at the same level, and the curved shape of the line being effected by means of a turn-sheave.

The whole curing process takes place under completely dry conditions, and employs the construction of the curing line in accordance with FIGS. 6, 7 and 8 possible. FIG. 6 shows a vertical curing tube, but the heating zone A of the curing tube 1' is located at a lower level than the cooling zone B. In FIG. 7 the curing tube 1" is curved, and the starting and finishing ends are located at essentially the same level. In the embodiment shown in FIG. 8 the starting and finishing ends of the line are both located at floor level, and the curved shape of the line is achieved by means of a turn-sheave. This has the advantage that operation of the line becomes considerably cheaper and expensive construction is avoided.

The figure and corresponding description are only intended to outline the consept of the invention. A device in accordance with the invention can vary considerably in details within the claims of the patent.

Although in the above description, heating is carried out by means of resistance heating of the curing tube, with the material of the tube wall acting as the resistance, heating can also be carried out by other radiation heating methods. A suitable gas seal can be fitted between the heating and cooling zones if different gases happen to be used in these zones and it is necessary to prevent the mixing of the inert gas and the gas in the cooling zone, or to prevent them from entering the other zones.

We claim:

1. An improved device for curing longitudinally extended crosslinkable products, such as cables, comprising a curing tube through which the product undergoing crosslinking is drawn, a heating zone, provided with equipment for heating the product in the curing tube up to the crosslinking temperature, and a cooling zone for cooling the crosslinked product and wherein said improvement being to provide said cooling zone of said curing tube with means to conduct the gaseous medium into said cooling zone to contact a crosslinked product.

2. A device as in claim 1, wherein the cooling zone is provided with means for blowing the gas along the surface of the crosslinked product.

3. A device as in claim 2, wherein the cooling zone of the curing tube is provided with inlet and outlet connections with said outlet connected to said inlet through a blower and a heat exchanger in order to direct the gas under pressure, after cooling, back to the cooling zone.

4. A device as in claim 3, wherein said blower is located in the same pressurised space as the gas itself.

5. A device as in claim 1, wherein the cooling zone of the curing tube is provided with a medium-proof mantle surrounding said tube to enable cooling of said tube.

6. A device as in claim 1, wherein said curing tube is provided over the cooling zone with equipment for blowing cooling gas or air on the outside surface of the tube to cool the tube walls.

7. A device as in claim 1, wherein the curing tube is placed so that the finishing end of the cooling zone of the curing tube is located at a higher level than the lowest point of the curing tube.

* * * * *

REEXAMINATION CERTIFICATE (2426th)
United States Patent [19]
Karppo et al.

[11] B1 4,155,695
[45] Certificate Issued  Nov. 15, 1994

[54] CONTINUOUS CURING DEVICE FOR LONGITUDINALLY EXTENDED PRODUCTS WITH COOLING ZONE

[75] Inventors: Jukka S. Karppo, Helsinki; Matti A. Aaltonen, Espoo, both of Finland

[73] Assignee: Oy Nokia AB, Helsinki, Finland

Reexamination Request:
No. 90/002,738, May 29, 1992

Reexamination Certificate for:
Patent No.: 4,155,695
Issued: May 22, 1979
Appl. No.: 756,543
Filed: Jan. 3, 1977

Related U.S. Application Data
[62] Division of Ser. No. 707,097, Jul. 20, 1976.

[30] Foreign Application Priority Data

Oct. 21, 1975 [FI] Finland ................... 752942

[51] Int. Cl.5 ............. B29C 35/06; B29C 35/08; B29C 35/14
[52] U.S. Cl. ................... 425/445; 425/174.4
[58] Field of Search .......... 425/445, 174.4, 71, 425/113, 508, 509, 516; 264/37, 25, 27, 83, 85, 174, 236, 237, 347, 348

[56] References Cited

U.S. PATENT DOCUMENTS

| | | | |
|---|---|---|---|
| 1,999,751 | 4/1935 | Clayton | 425/445 |
| 2,023,665 | 12/1935 | Clayton | 264/347 |
| 3,513,228 | 5/1970 | Miyauchi et al. | 264/85 X |
| 3,534,132 | 10/1970 | Bailey et al. | 264/104 |
| 3,558,954 | 6/1971 | Nakamura et al. | 425/174.4 |
| 3,645,656 | 2/1972 | Stauffer et al. | 425/71 |
| 3,802,913 | 4/1974 | MacKenzie, Jr. | 428/389 |
| 3,846,528 | 11/1974 | Chrisman et al. | 264/85 |
| 3,868,436 | 2/1975 | Ootsuji et al. | 264/174 X |
| 3,946,099 | 3/1976 | MacKenzie, Jr. | 264/236 X |
| 4,035,129 | 7/1977 | Karppo et al. | 425/445 |

FOREIGN PATENT DOCUMENTS

| | | |
|---|---|---|
| 916655 | 8/1954 | Germany . |
| 2005235 | 5/1973 | Germany . |
| 2234851 | 1/1974 | Germany . |
| 1806194 | 9/1975 | Germany . |
| 1779425 | 7/1977 | Germany . |
| 2233884 | 9/1978 | Germany . |
| 115485 | 12/1945 | Sweden . |
| 357575 | 5/1930 | United Kingdom . |
| 415428 | 2/1933 | United Kingdom . |
| 406528 | 5/1933 | United Kingdom . |
| 491052 | 9/1937 | United Kingdom . |
| 505162 | 5/1939 | United Kingdom . |
| 1025202 | 4/1966 | United Kingdom . |

*Primary Examiner*—Richard L. Chiesa

[57] ABSTRACT

An apparatus for continuous curing (vulcanization) of elongated products, such as cables comprising a conductor surrounded by a mantle of a crosslinkable material. The cable is passed longitudinally through a curing tube in which the cable is first subjected to heating in a heating zone for heating the cable to curing temperature and subsequently subjected to cooling. The heating of the cable in the heating zone is carried out by means of heat radiation in a pressurized gas atmosphere and the cooling of the cable in the cooling zone is carried out in the pressure of a gas under pressure so that heat is transferred from the heated cable in the cooling zone partially by radiation to the cooled wall of the tube and partly by convection to said cooled gas.

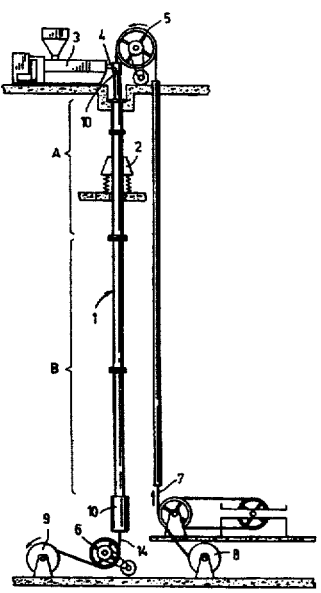

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 17-27:

It is well known that a curing tube, through which the crosslinkable product is drawn, and in which the product is subjected firstly to heating, so that the material, in the product, containing the crosslinking agent reaches a temperature at which the crosslinking reaction can take place, and then to cooling, and is finally [quided] *guided* out of the curing tube, can be used for the crosslinking of cables. Included in this type of crosslinking material are, for example, high density polyethylene, low density polyethylene, ethylene propylene rubber and other synthetic and natural rubbers.

Column 4, lines 28-48:

FIG. 2 shows the curing section 1 on a larger scale, consisting of a curing tube 11 through which the crosslinkable product is [quided] *guided* axially, in this case from the top end of the tube, and through the tube towards its lower end. The tube is made of pressure and temperature resistant material such as steel. While passing through the tube the product is subjected to curing heating and then to cooling. The heating zone is denoted by A and the cooling zone by B. The curing tube is surrounded over the heating zone, by a concentric mantle tube 12, which is made, for example, of copper. The upper end of this mantle tube is connected to one pole of a low voltage transformer 13, and the upper end of the curing tube is connected to the other pole of the transformer so that the mantle tube functions as a connection conductor for the heating current to the curing tube. When the electric current is connected the curing tube heats up and functions, within the heating zone, A, as a heating mantle which is uniform both around its circumference and along its axis, and from which heat radiates to the crosslinkable product.

Column 6, lines 20-23:

The figure and corresponding description are only intended to outline the [consept] *concept* of the invention. A device in accordance with the invention can vary considerably in details within the claims of the patent.

AS A RESULT OF REEXAMINATION, IT HAS BEEN DETERMINED THAT:

Claims 1-7 are cancelled.

New claims 8-16 are added and determined to be patentable.

*8. An apparatus for continuous curing of a longitudinally extending crosslinkable product under completely dry conditions, comprising:*

*a curing tube through which the product is longitudinally drawn, the curing tube including a heating zone, a cooling zone and means for maintaining inert gas in the heating and cooling zones at a pressure above atmospheric pressure;*

*a heater in the heating zone for radiation heat toward the product to heat the product in the pressurized inert gas to a crosslinking temperature under water free conditions to create a dry crosslinked product; and*

*circulator means in the cooling zone for circulating the pressurized inert gas in the cooling zone to cool the crosslinked product under water free conditions, the circulator means including a blower for contacting the crosslinked product with the pressurized inert gas to transfer heat from the crosslinked product by radiation to a wall of the curing tube and by convection to the gas to create a dry crosslinked product without water filled micro voids capable of generating water trees.*

*9. An apparatus as in claim 8, wherein the circulator means in the cooling zone includes inlet and outlet connections with the outlet connection connected to the inlet connection through a heat exchanger to cool the pressurized inert gas and return the cooled pressurized gas to the cooling zone.*

*10. An apparatus as in claim 9, wherein the cooling zone includes an entrance and exit for the product passing therethrough, the inlet connection being located adjacent the exit of the cooling zone and the outlet connection being located adjacent the entrance of the cooling zone.*

*11. An apparatus as in claim 8, wherein the blower is located within the wall of the curing tube in the cooling zone.*

*12. An apparatus as in claim 8, wherein the cooling zone is surrounded by a gas-proof mantle to cool the wall of the curing tube.*

*13. An apparatus as in claim 8, wherein the curing tube is provided over the cooling zone with a cooling blower for blowing cooling gas on an outside surface of the wall of the curing tube to cool the wall.*

*14. An apparatus as in claim 8, wherein the curing tube has a product entrance and a product exit, and the product exit is located at a vertical level higher than a vertical level of a lowest point in the curing tube.*

*15. An apparatus as in claim 8, wherein the curing tube is provided over the heating zone with a conducting mantle having one end connected to a pole of a transformer, so that a current passed through the mantle heats the curing tube over the heating zone to radiate heat toward the product.*

*16. An apparatus as in claim 8, wherein the product is a high voltage electrical cable for conducting voltages of at least 5 kV/mm.*

* * * * *